Oct. 17, 1939.   L. J. ROSE   2,176,562
DISPENSING DEVICE WITH REGULATED MEASURING MEANS
Filed March 24, 1937   2 Sheets-Sheet 1
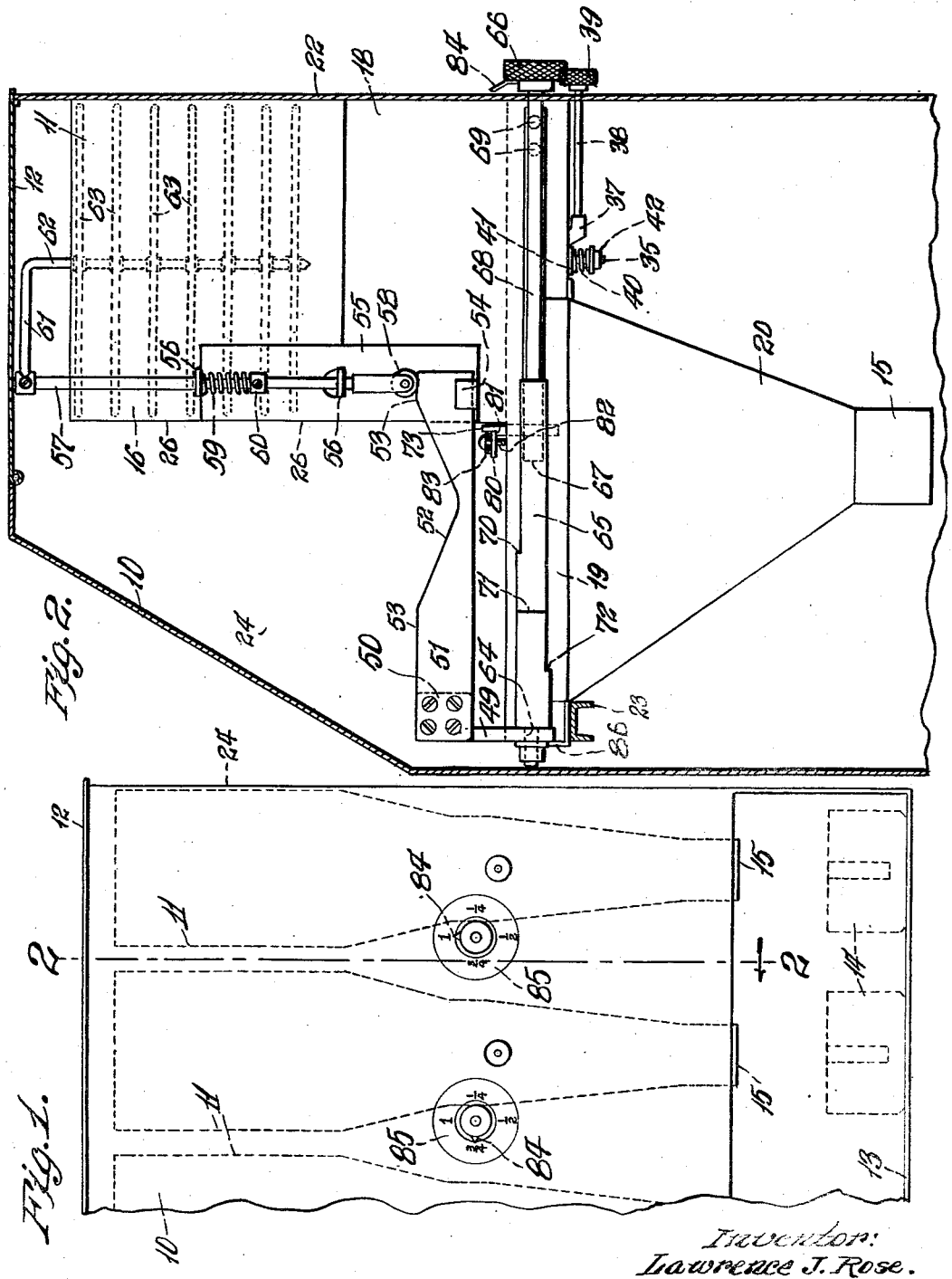
Inventor:
Lawrence J. Rose.
By Herbert G. Fletcher
Atty.

Oct. 17, 1939.                L. J. ROSE                2,176,562
          DISPENSING DEVICE WITH REGULATED MEASURING MEANS
                    Filed March 24, 1937        2 Sheets-Sheet 2
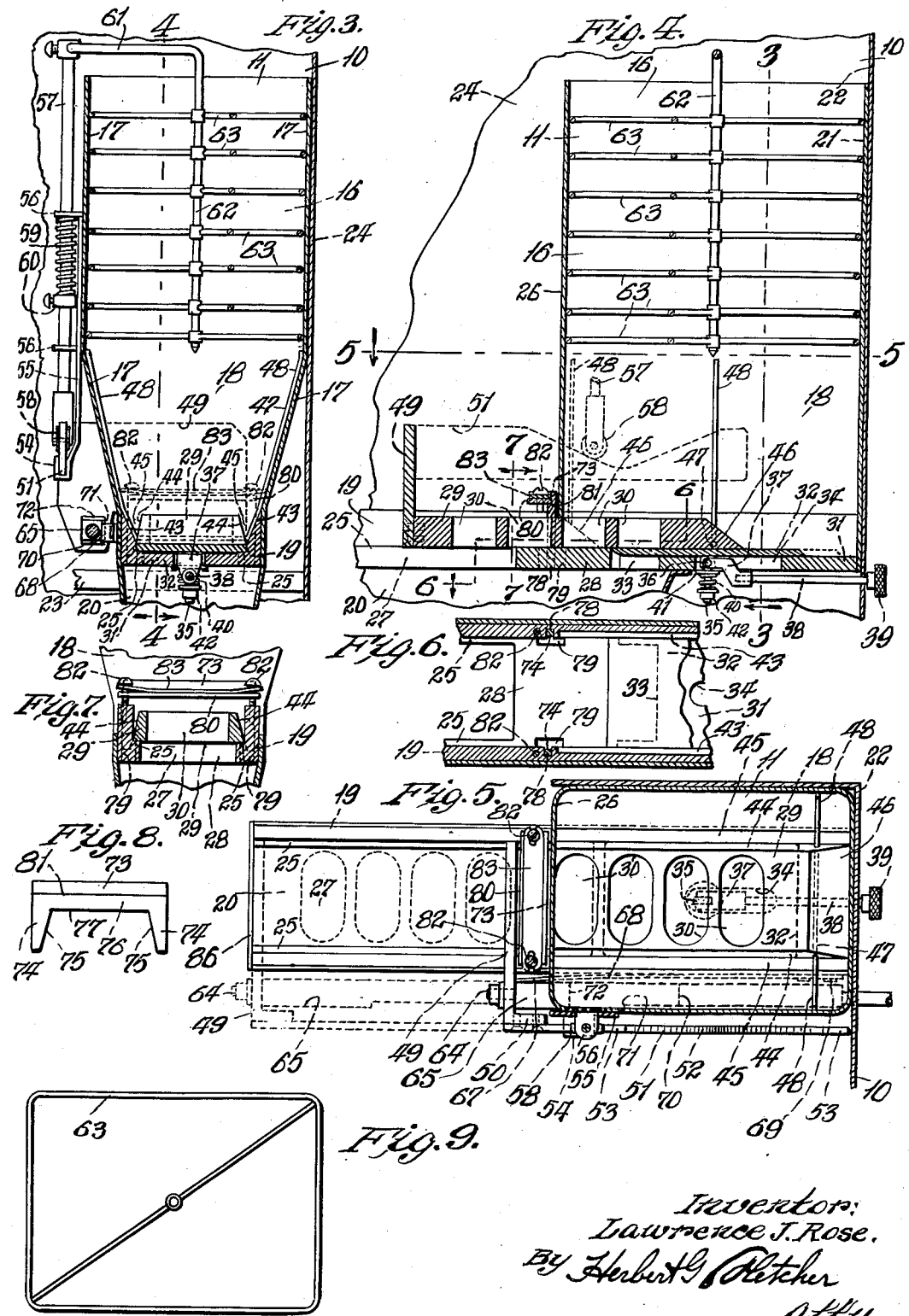
Inventor:
Lawrence J. Rose.
By Herbert G. Fletcher
                atty

Patented Oct. 17, 1939

2,176,562

UNITED STATES PATENT OFFICE

2,176,562

DISPENSING DEVICE WITH REGULATED MEASURING MEANS

Lawrence J. Rose, St. Louis, Mo.

Application March 24, 1937, Serial No. 132,706

16 Claims. (Cl. 221—105)

This invention relates to improvements in a dispensing device with regulated measuring and discharging means for pre-determining desired quantities of powdered or granulated ingredients or the like, as required in assisting in baking and cooking.

The principal object of the invention is to provide a dispensing device with combined measuring and discharging means which can be readily adjusted in a simple manner to standard measurements, such as from teaspoon sizes or portions thereof, attendant with the desired size of the pockets of the measuring means for the regulated discharge of baking and cooking ingredients as may be required.

Another object is to provide an improved form of an adjustable receiving and discharging element in the device which is cooperable with the adjusting means.

A further object is to provide the storing hopper of the device with wall scraping means which are cooperable with the combined measuring and discharging means for loosening or breaking away portions of the ingredients in the hopper which may tend to cling to the walls thereof.

A still further object is to provide the device with an improved slidable measuring and discharging element.

Other objects and advantages will appear as this description progresses and by reference to the drawings, in which:

Figure 1 is a front elevation of a fragmentary portion of a cabinet having a tier or battery of hoppers for storing baking ingredients to be discharged in regulated quantities, and to which this invention is applicable and as shown.

Figure 2 is an enlarged vertical elevation partly in section, taken approximately on the line 2—2 of Fig. 1.

Figure 3 is an enlarged fragmentary vertical sectional elevation taken approximately on the line 3—3 of Fig. 4.

Figure 4 is an enlarged fragmentary vertical sectional elevation taken approximately on the line 4—4 of Fig. 3.

Figure 5 is an enlarged horizontal sectional elevation taken approximately on the line 5—5 of Fig. 4.

Figure 6 is an enlarged fragmentary horizontal sectional elevation taken approximately on the line 6—6 of Fig. 4.

Figure 7 is an enlarged fragmentary vertical sectional elevation taken appproximately on the line 7—7 of Fig. 4.

Figure 8 is an enlarged front elevation of a guard element used on the device.

Figure 9 is an enlarged horizontal elevation of one of the hopper wall scraping elements used on the device.

Referring to the drawings, 10 designates a cabinet which may be used for housing a battery of storing hoppers 11 with respective dispensing devices of the invention, and the cabinet having a swingable lid 12 on its top which may extend the length of the cabinet to serve as a cover for the battery of open topped hoppers. The cabinet 10 at its lower end is provided with a shelf 13 on which the receptacles 14 are placed for receiving the measured discharge of ingredients from the spouts 15 of respective hoppers 11.

For the purposes of illustration, but one of the storing hoppers 11 and its respective dispensing device, is shown and described in detail as follows:

The hopper 11 is provided with a vertically extending straight-walled part 16, the side walls 17 of said part at their lower ends, inclining towards each other (Fig. 3) to provide a funnel shaped part 18 at the lower end of the hopper, and secured at the lower end of the part 18 and serving as a bottom for the hopper, is a guiding block 19. Depending from the guiding block 19 is a discharge receiving funnel 20 having the depending discharge spout 15 at its lower end.

The hopper 11 may be fastened within the cabinet 10 by securing its front wall 21 to the front wall 22 of the cabinet, and by a longitudinally disposed horizontal member 23 which may underengage the rear end of the guiding block 19, said member 23 being supported at its ends by the end walls 24 of the cabinet.

The guiding block 19 rearwardly thereof, is provided with a pair of guide ways 25 which extend to and adjacent the rear wall 26 of the hopper 11, the guiding block 19 between said guide ways being open, as designated at 27, for communication with the funnel 20 therebeneath. Joining the guide ways 25 on a plane beneath the lower end of the rear wall 26 of the hopper 11 is a horizontally disposed bottom portion 28 which is on the same horizontal plane as the guide ways 25, said portion 28 extending a distance forwardly and rearwardly of the hopper wall 26, the guide ways 25 and the portion 28 forming a guiding surface for the combined measuring and discharging element 29, which is provided with a series of vertically disposed open ended pockets 30.

The guiding block 19 on that portion thereof which is disposed within the funnel shaped part 18 of the hopper 11, is provided with a horizontal bottom portion 31 having its top surface on a plane lower than that of the bottom portion 28, and mounted on said bottom portion 31, is a slidable plate 32 having one end in cooperation with a discharge opening 33 which is disposed between the bottom portions 28 and 31 (Fig. 4).

An elongated opening 34 is formed in the bottom portion 31 and depending therethrough from the plate 32, is a pin or leg 35, and connected to said pin at 36 is a bifurcated member 37 which forms an end connection for a pull rod 38 which extends horizontally and forwardly beneath the bottom portion 31 and through an aperture in the front wall 22 of the cabinet 10, the extending end of said rod having a finger grip button 39 secured thereto. A coil spring 40 is mounted on the pin 36 and interposed between it and the under surface of the bottom portion 31 is a washer 41, said spring providing for the resilient holding of the slidable plate 32 against the top surface of the bottom portion 31 of the guiding block 19 and is secured on the pin 35 by the nut 42. The thickness of the slidable plate 32 is such wherein its upper surface will be flush with the upper surface of the bottom portion 28 of the guiding block 19.

That portion of the guiding block 19 which is disposed within the hopper structure, on each side is provided with a downwardly and inwardly inclining surface 43, joining with respective surfaces of the walls 17 of the funnel shaped part 18 of the hopper 11, and the side surfaces 44 of the element 29 are each inclined downwardly and outwardly so as to form an approximate V-shaped pocket 45 on each side of the element 29 (Fig. 3).

As the hopper 11 will maintain a storage of powdered or granulated material and the element 29 is to be reciprocated back and forth in the hopper beneath the material, the front end of the element 29 is provided with a downwardly inclined nose 46 so that the element 29 can more aptly ride under the material mass, and when so doing, the V-shaped pocket 45 on each side of the element will receive the sidewise crowded material without any detrimental binding effect at the sides of the element 29. (Figs. 3 and 4.)

Secured to and carried by the nosed end 46 of the element 29, is a U-shaped member 47 having its extending portions 48 in conforming engagement with respective inclining walls 17 of the funnel shaped part 18 of the hopper 11, and secured to the rear end of the element 29 is a horizontally disposed transverse member 49 which is located outside of and at the rear of the hopper 11. (Figs. 3, 4 and 5.)

Secured to the bent end 50 of the member 49 and paralleling the guiding block 19, is a cam plate 51 having a vallied cam surface 52 and end disposed cam surfaces 53, said cam plate 51 being slidably mounted in a supporting portion 54 which is extended from the lower end of a supporting member 55 which is secured to one side of the hopper 11.

A pair of vertically alined apertured parts 56 are struck from the supporting member 55, and sustained in said parts 56 is an actuating rod 57, and supported at the lower end of said rod is a roller 58, and mounted on said rod is a coil spring 59 which at one end, is in abutment with the upper part 56 and its other end being in abutment with a set collar 60, said coil spring thrusting said rod downwardly for maintaining the roller 58 on the cam surfaces of the cam plate 51. (Figs. 2 and 3.)

Secured to the upper end of the rod 57 is a right-angularly bent leg 61 having its vertical portion 62 depending approximately centrally within the hopper 11, and secured to the portion 62 of said leg in spaced relation, are a plurality of horizontally disposed scraping members 63 each having their marginal edges contacting the inner faces of the straight-walled part 16 of the hopper 11.

Paralleling the guiding block 19 and turnably secured at one end at 64 to the transverse member 49, is a longitudinally disposed flat-sided adjusting member 65 having its opposite end turnably supported in the front wall 22 of the cabinet 10 with a finger grip button 66 secured on its extending end outwardly of the wall 22.

For cooperation with the flat sides of the adjusting member 65, is the extending end 67 of a paralleling leaf spring 68 which is secured at its opposite end to a part of the hopper and/or the guiding block 19 by the screws or rivets 69. For cooperation with the end 67 of the leaf spring 68 are the shoulders 70, 71 and 72, each of which is formed on a respective flat side of the adjusting member 65 and have to do with respective pockets 30 of the combined measuring and discharging element 29.

Adapted to cooperate with the combined measuring and discharging element 29 for preventing escape or the dragging out of powdered material at the inclined surfaces or sides 44 and the top surface of the element, a scraping guard 73 is provided, said guard 73 being mounted outside of the hopper 11 and adjacent the rear wall 26 thereof, and is provided with a pair of legs 74, each with a tapered inner face 75 for straddling cooperation with respective surfaces 44 of the element, and the intermediate portion 76 of the guard having a horizontal face 77 for cooperation with the top surface of the element 29. (Figs. 3, 4, 7 and 8.)

For supporting the guard 73 in cooperative position with the slidable element 29, a vertical recess 78 is formed in each side of the guiding block 19, and each recess extending to and communicating with respective elongated openings 79 which are formed in the bottom portion 28 of the guiding block 19. (Figs. 4, 6 and 7.)

The legs 74 of the guard 73 are engaged in respective recesses 78 in straddling relation with the element 29, and a holding plate 80 is engaged and held against the shoulder 81 of the guard 73 by the securing screws 82 which pass through said holding plate and the bifurcated ends of a leaf spring 83, and are secured in opposing sides of the guiding block 19, as shown more clearly in Figs. 3, 4, 5 and 7. Obviously, the leaf spring 83 will cause the guard 73 to resiliently engage the slidable element 29.

When the hopper 11 is filled with a granulated powder such as baking powder, and it is desired to operate the device for regulated discharge of the material, the combined measuring and discharging element 29 is normally in a retracted position, as shown in the dotted lines in Fig. 5. When the element 29 is pulled forward by engaging and pulling the finger grip button 66 for disposing the element in the position shown in full lines in Fig. 5, in which the four pockets 30 thereof, are located within the lower end of the funnel shaped part 18 of the hopper 11, all of said pockets 30 will be filled by the gravitating weight of the powdered material.

In the location of all the pockets 30 within the hopper, as shown in full lines in Fig. 5, it is to be noted that the end 67 of the leaf spring 68 is in abutment with the transverse member 49 of the element 29. This completely drawn forward position of the element 29 is permitted by the adjusting member 65 being previously turned by the finger grip button 66 thereof, to this precise position of adjustment wherein there are no shoulders or projections on the particular flat side of the adjusting member with which the end 67 of the leaf spring 68 can engage, thus permitting the element 29 to be drawn forward the maximum distance of travel.

Upon retracting the element 29 after the pockets 30 thereof have been filled with the material from the hopper 11 by exerting a pushing force on the finger grip button 66 of the adjusting member 65, the material from the respective pockets, will be discharged into the discharge receiving funnel 20 through the space or opening 27 provided between the guide ways 25, at the rear end of the guiding block 19.

Assuming that each of the pockets 30 is of a size to contain a ¼ teaspoonful, obviously the discharging of the quantities in the four pockets shown, will equal one (1) teaspoonful.

In setting the adjusting member 65 for predetermining a quantity of material to be discharged, the button 66 is turned to position the pointer 84 thereof, opposite the desired designating character on the dial 85 (Fig. 1) and if the pointer 84 is positioned at the character ¼ on the dial, the flat side of the adjusting member 65 having the shoulder 70 will be placed in alining position for abutment with the end 67 of the leaf spring 65, and wherein but the first and forward pocket 30 of the element 29 will be entered in the hopper 11 just inwardly of the rear wall 26 of the hopper, as the element 29 is pulled forward by the operator. Upon pushing the adjusting member 65 rearward, the filled pocket 30 of the element 29 will discharge the ¼ teaspoon measure into the funnel 20.

Upon turning the button 66 so that the pointer 84 thereof will designate the character ½, the shoulder 71 of the adjusting member 65 will be placed in alinement for abutment with the end 67 of the leaf spring 68 so that when the element 29 is drawn forward, the first and second pockets 30 only, of the element 29 will be permitted to enter the hopper 11 for filling (Fig. 4), and the discharge of these two pockets into the funnel 20 of course will indicate an amount of ½ teaspoon measure.

Further turning of the button 66 to indicate the designating character ¾ on the dial, will position the shoulder 72 for abutting engagement with the end 67 of the leaf spring 68, this position of indication permitting the first three of the pockets 30 of the element 29 to enter the hopper 11 for filling, and upon the element 29 being retracted to the position shown in dotted lines in Fig. 5, the discharge of these three filled pockets will be accomplished.

From the above instances of the reciprocating operation of the combined measuring and discharging element 29, it is to be noted that when drawing the element 29 forward for disposing respective pockets 30 thereof as desired, into the hopper 11, the forward travel of said element is predeterminedly limited by engagement of the end 67 of the leaf spring 68 with either of the shoulders 70, 71 and 72 and the transverse member 49, and upon sliding the element 29 inward, the inward travel thereof is stopped by abutment of the lower end of the member 49 with the projection 86 at the rear end of the guiding block 19.

By reason of the adjusting member 65 being flat-sided, the tension of the leaf spring 68 against respective flat sides, will hold said member 65 against inadvertent turning.

As the combined measuring and discharging element 29 is reciprocated back and forth in the hopper 11 for receiving and discharging measured quantities of material from the hopper, the cam surfaces 52 and 53 of the cam plate 51 with which the roller 58 is engaged, will vertically reciprocate the rod 57 and the scraping members 63 carried by the leg 61, the scraping action of the members 63 wiping the inner surfaces of the straight-walled part 16 of the hopper 11, thus breaking away portions of the material which may tend to stick to the wall surfaces.

If a quantity of unmeasured material from the hopper is required, the operator upon engaging the button 39 on the rod 38 and upon pulling the button, will slide the plate 32 forward to provide discharging communication between the lower end of the hopper and the discharge opening 33, so that a quantity of material can be discharged into the funnel 20 without operating the element 29.

With further regard to the reciprocable element 29, the extending ends 48 of the U-shaped member 47 will engage the inclined walls 17 of the funnel shaped part 18 of the hopper 11, as said element 29 is reciprocated, thus freeing sticking particles if any, of the powdered material.

The scraping guard 73 which is resiliently mounted on and against the reciprocable element 29 for preventing powdered material being outwardly dragged from the hopper beneath the lower end of the rear hopper wall 26, will tend to prevent escape of the powdered material at the top of the element 29 and the inclined sides 44 of the element 29. However, what powdered material may be caught between the guard 73 and the element 29, discharge thereof will be made downwardly, inwardly of the legs 44 of the guard where it will find escape through a respective elongated opening 79, formed in the bottom portion 28 of the guiding block 19 and from where the escaping particles will fall into the funnel 20.

Having thus described my invention so that those skilled in the art will be able to practice the same, what I desire to secure by Letters Patent is defined in what is claimed, it being understood that various changes in the device shown and described above in detail and not amounting to invention may be made without departing from the spirit and scope of my invention.

What I claim is:

1. A dispensing device comprising a storing hopper having a bottom wall, a combined receiving and discharging element horizontally reciprocable within said hopper on the bottom wall thereof and having a series of open ended vertical pockets therein which are closed by the bottom wall of the hopper, and adjustable means for regulating the distance of travel of said element within said hopper.

2. A dispensing device comprising a storing hopper and a rearwardly disposed discharging funnel, a combined receiving and discharging element reciprocable within the lower end of said hopper and above said funnel and having a series of pockets therein, the pockets of said element adapted to hold and convey material from the hopper to the funnel, and reciprocating means for said element having adjustable means for regulating the distance of travel of said element within said hopper.

3. A dispensing device comprising a storing hopper, a combined receiving and discharging element reciprocable within the lower end of said hopper, a hopper wall scraping member carried by said element and having a pair of fixed upwardly extending ends, and adjustable means for regulating the distance of travel of said element within said hopper.

4. A dispensing device comprising a storing hopper having perpendicular walls, a combined receiving and discharging element reciprocable within the lower end of said hopper, and vertically reciprocal wall scraping means within the hopper having cooperable connection with said element and scraping contact with said perpendicular walls of the hopper.

5. A dispensing device comprising a storing hopper, a combined receiving and discharging element reciprocable within the lower end of said hopper, wall scraping means carried by said element, and other wall scraping means disposed in a plane above said first mentioned wall scraping means and having cooperable connection with said element.

6. A dispensing device comprising a storing hopper having both tapering and perpendicular walls, a combined receiving and discharging element reciprocable within the lower end of said hopper, wall scraping means carried by said element for cooperation with said tapering walls, other wall scraping means having cooperable connection with said element for cooperation with said perpendicular walls, and adjustable means for regulating the distance of travel of said element within said hopper.

7. A dispensing device comprising a storing hopper, a combined receiving and discharging element reciprocable within the lower end of said hopper and having a deflectingly nosed forward end, and adjustable operating means connected to said element and disposed outside of said hopper for regulating the distance of travel of said element within said hopper.

8. A dispensing device comprising a storing hopper, a combined receiving and discharging element reciprocable within the lower end of said hopper, adjusting means cooperable with and paralleling said element for regulating the distance of travel of said element within said hopper, said adjusting means having a series of side disposed projections at different distances of its length, and resilient means for cooperation with respective projections for limiting the travel of said element.

9. A dispensing device comprising a storing hopper, a combined receiving and discharging element reciprocable within the lower end of said hopper, turnable adjusting means secured to and cooperable with said element for reciprocating said element within said hopper, said adjusting means being flat-sided and having a projection on respective sides, and a fixed resilient member for engagement with respective projections of said adjusting means for limiting the distance of travel of said element.

10. A dispensing device comprising a storing hopper, a combined receiving and discharging element reciprocable within the lower end of said hopper, means for adjusting said element for different distances of travel within said hopper, and a spring actuated guard straddling said element in bearing relation therewith and located adjacent a wall of said hopper.

11. A dispensing device comprising a storing hopper, and a horizontally reciprocable discharging element having downwardly and outwardly tapering sides and a deflecting forward end and adapted to be reciprocated within the hopper.

12. A dispensing device having a storing hopper, a discharging element reciprocable within said hopper, and wall scraping means carried by said element and having upwardly projecting end portions paralleling and bearing against opposing walls of the hopper.

13. A dispensing device for powdered or granular material comprising a storing hopper having opposing inwardly tapering side portions at its lower end, and a horizontally slidable discharging element having downwardly and outwardly tapering sides mounted in the lower end of said hopper parallel to said tapering side portions of the hopper.

14. A dispensing device having a storing hopper for powdered or granular material, a discharging element horizontally reciprocable within said hopper, adjustable means for regulating the traveling distance of said element, and vertically reciprocable wall scraping means within the hopper having cooperable connection with said element.

15. A dispensing device comprising a storing hopper having a bottom wall with a discharge opening therein, a slidable plate forming a part of said bottom wall and having its top surface flush therewith and said plate being cooperable to close said discharge opening, a combined receiving and discharging element reciprocably mounted on said bottom wall and having an open-ended vertical opening therein which is cooperable with said discharge opening when said plate is withdrawn from covering said discharge opening, and reciprocating means for said element.

16. A dispensing device comprising a storing hopper having a bottom wall, a combined receiving and discharging element horizontally reciprocable within the lower end of said hopper and having a series of open ended vertical openings therein which are closed at their lower ends by the bottom wall of the hopper, reciprocating means for said element, and adjustable means forming part of said reciprocating means for regulating the distance of travel of said element within said hopper.

LAWRENCE J. ROSE.